(12) United States Patent
Gandhi et al.

(10) Patent No.: US 7,680,831 B1
(45) Date of Patent: Mar. 16, 2010

(54) METHODS AND APPARATUS FOR DETECTION AND RECOVERY OF DATABASE OUT OF SYNCHRONIZATION CONDITIONS

(75) Inventors: Rajesh K. Gandhi, Shrewsbury, MA (US); Keith Alan Carson, Jr., Hopkinton, MA (US); Venkata R. Tiruveedi, Wayland, MA (US); Anoop George Ninan, Milford, MA (US); Samuil Shmuylovich, Framingham, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 884 days.

(21) Appl. No.: 11/476,380

(22) Filed: Jun. 28, 2006

(51) Int. Cl.
*G06F 12/00* (2006.01)

(52) U.S. Cl. ...................................... 707/200

(58) Field of Classification Search ............... 707/8–10, 707/200–206
See application file for complete search history.

(56) References Cited

U.S. PATENT DOCUMENTS

| 5,907,602 | A | * | 5/1999 | Peel et al. ............... 379/114.14 |
| 6,144,726 | A | * | 11/2000 | Cross .................... 379/114.03 |
| 6,363,462 | B1 | * | 3/2002 | Bergsten ...................... 711/162 |
| 2003/0171876 | A1 | * | 9/2003 | Markowitz et al. ............ 702/20 |

* cited by examiner

*Primary Examiner*—Wilson Lee
(74) *Attorney, Agent, or Firm*—Chapin IP Law, LLC

(57) ABSTRACT

A system detects an event suggesting a data discrepancy between a staging database and a production database that maintain network management data within a network management system. The staging database is logically separate from the production database. The system prevents modification to the production database, and replaces data in the staging database with data from the production database. The system then allows modification to the production database.

20 Claims, 8 Drawing Sheets

```
STAGINGLOCKABLE TABLE 142

STAGINGLOCKABLE RECORD 144-1

STAGINGLOCKABLE RECORD 144-2

STAGINGLOCKABLE RECORD 144-N
```

```
STAGINGSTATUS TABLE 146

STAGINGSTATUS RECORD 148-1    152-1   154-1

STAGINGSTATUS RECORD 148-2    152-2   154-2

STAGINGSTATUS RECORD 148-N    152-N   154-N
```

*FIG. 2*

204 DETECT AN EVENT SUGGESTING A DATA DISCREPANCY BETWEEN A STAGING DATABASE AND A PRODUCTION DATABASE THAT MAINTAIN NETWORK MANAGEMENT DATA WITHIN A NETWORK MANAGEMENT SYSTEM, THE STAGING DATABASE LOGICALLY SEPARATE FROM THE PRODUCTION DATABASE

205 DETECT A FAILURE DURING A COPY PROCESS THAT COPIES DATA FROM THE STAGING DATABASE TO THE PRODUCTION DATABASE

206 DETECT A FAILURE DURING A RETRY PROCESS THAT RETRIES A FAILED TRANSACTION PROCESS THAT ACCESSES THE STAGING DATABASE

207 DETECT A FAILURE OF A STORE PROCESS THAT STORES DATA ASSOCIATED WITH A NON-PARTITIONED TRANSACTION TO THE PRODUCTION DATABASE, THE DATA ASSOCIATED WITH A NON-PARTITIONED TRANSACTION RECEIVED BY THE STORE PROCESS FROM AN AGENT

208 DETECT A FAILURE OF A STORE PROCESS THAT STORES DATA IN THE STAGING DATABASE, THE DATA RECEIVED FROM THE PRODUCTION DATABASE

FIG. 4

209 DETECT AN EVENT SUGGESTING A DATA DISCREPANCY BETWEEN A STAGING DATABASE AND A PRODUCTION DATABASE THAT MAINTAIN NETWORK MANAGEMENT DATA WITHIN A NETWORK MANAGEMENT SYSTEM, THE STAGING DATABASE LOGICALLY SEPARATE FROM THE PRODUCTION DATABASE

210 DETECT A FAILURE DURING COMPARISON BETWEEN DATA IN THE STAGING DATABASE AND DATA IN THE PRODUCTION DATABASE

211 EXECUTE A DATABASE QUERY THAT PERFORMS A COMPARISON BETWEEN DATA IN THE STAGING DATABASE AND DATA IN THE PRODUCTION DATABASE, THE DATABASE QUERY RETURNING A RESULT INDICATING THE COMPARISON BETWEEN DATA IN THE STAGING DATABASE AND DATA IN THE PRODUCTION DATABASE FAILED

*FIG. 5*

212 DETECT AN EVENT SUGGESTING A DATA DISCREPANCY BETWEEN A STAGING DATABASE AND A PRODUCTION DATABASE THAT MAINTAIN NETWORK MANAGEMENT DATA WITHIN A NETWORK MANAGEMENT SYSTEM, THE STAGING DATABASE LOGICALLY SEPARATE FROM THE PRODUCTION DATABASE

213 RECORD THAT A DATA DISCREPANCY BETWEEN THE STAGING DATABASE AND THE PRODUCTION DATABASE HAS OCCURRED

214 RAISE AN EXCEPTION ASSOCIATED WITH THE DATA DISCREPANCY BETWEEN THE STAGING DATABASE AND THE PRODUCTION DATABASE

↓

215 LOG AN ERROR ASSOCIATED WITH THE DATA DISCREPANCY

OR

216 RECORD A STAGING TABLE NAME INDICATING A STAGING TABLE IN THE STAGING DATABASE THAT IS NOT SYNCHRONIZED WITH A CORRESPONDING PRODUCTION TABLE IN THE PRODUCTION DATABASE

OR

217 SET A STATUS IN A STAGING STATUS TABLE, THE STATUS INDICATING A DATA DISCREPANCY HAS OCCURRED

↓

218 RECORD A TIMESTAMP IN THE STAGING STATUS TABLE, THE TIMESTAMP INDICATING A DATE ON WHICH THE DATA DISCREPANCY OCCURRED

*FIG. 6*

226 REPLACE DATA IN THE STAGING DATABASE WITH DATA FROM THE PRODUCTION DATABASE

227 DETECT THAT A DATABASE PROCESS IS ATTEMPTING TO WRITE DATA TO THE STAGING DATABASE DURING THE STEP OF REPLACING DATA IN THE STAGING DATABASE WITH DATA FROM THE PRODUCTION DATABASE

228 DETERMINE THAT THE DATABASE PROCESS HAS ATTEMPTED TO ACQUIRE A LOCK ON A STAGING TABLE ASSOCIATED WITH THE DATA THAT THE DATABASE PROCESS IS ATTEMPTING TO WRITE TO THE STAGING DATABASE

229 ALLOW THE DATABASE PROCESS TO WAIT TO ACQUIRE THE LOCK ON THE STAGING TABLE

OR

230 DETERMINE THAT THE DATABASE PROCESS HAS NOT ATTEMPTED TO ACQUIRE A LOCK ON A STAGING TABLE ASSOCIATED WITH THE DATA THAT THE DATABASE PROCESS IS ATTEMPTING TO WRITE DATA TO THE STAGING DATABASE

231 ABORT THE DATABASE PROCESS ATTEMPTING TO WRITE DATA TO THE STAGING DATABASE

232 INVOKE A DATABASE ERROR DURING THE ATTEMPT TO WRITE DATA TO THE STAGING DATABASE

*FIG. 8*

METHODS AND APPARATUS FOR DETECTION AND RECOVERY OF DATABASE OUT OF SYNCHRONIZATION CONDITIONS

RELATION TO OTHER APPLICATIONS

This application relates to the following applications filed on the same date as the present application:
i) "METHODS AND APPARATUS FOR COLLECTING DATABASE TRANSACTIONS", Filed Jun. 28, 2006, Ser. No. 11/476,521
ii) "METHODS AND APPARATUS FOR SYNCHRONIZING NETWORK MANAGEMENT DATA", Filed Jun. 28, 2006, Ser. No. 11/477,026

The teachings and disclosure of the above co-filed applications are each incorporated by reference herein in their entirety.

BACKGROUND

The rapid expansion of information service and data processing industries has resulted in a need for computer systems to manage and store large amounts of data. As an example, financial service industry businesses such as banks, mutual find companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource (i.e., a managed resource) in the storage area network and apply a management command in order to display corresponding management information.

Enterprise Storage Networks or Storage Area Networks (SANs) are large and complex environments that include various elements such as storage arrays, switches, hosts and databases all inter-networked. These elements may exist in number by the hundreds in large installations of such environments. These elements in turn may consist of several hundred or thousands of manageable elements or managed resources such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on host computer systems in a SAN for the purpose of gathering data about the various managed resources in the SAN. The agents periodically collect network management data on components such as hosts, switches and storage systems that process and persist data, as well as on applications that use persisted information to enable the management of these environments. In other words, agents collect data associated with the managed resources, and that data is inserted into databases for use within Storage Resource Management solutions, such as ECC. ECC identifies the entire process of retrieving the collected data from agents to data persistence as a transaction. Agents collect data periodically, such as nightly, on the resources and engage in a transaction to send the collected data to the ECC repository for access by ECC applications such as console and server processes that allow SAN administrators to manage the SAN.

Typically, in a SAN management application, an agent collects data associated with the managed resources such as data storage systems, hosts, switches and the like. The agent transmits the data to a production database where the data is inserted. As managed object data is inserted into the production database, that data can be displayed on the console for the network manager to view. In some instances, a set of managed object data collected by an agent from a resource such as a Symmetrix disk array system is a very large amount of data to be placed into the production database. In this situation, the agent divides the collected set of data into manageable partitions prior to being transmitted to the production database. The agent then transmits each partition, one by one, to the production database for storage.

SUMMARY

As discussed in the co-pending application incorporated by reference above entitled "METHODS AND APPARATUS FOR COLLECTING DATABASE TRANSACTIONS" Ser. No. 11/476,521, problems can occur when one or more partitions are not successfully inserted into the production database, resulting in partial data being delivered to the console, and resulting in the inability to access the production database during updates from agents (i.e., during transaction processing). Use of a staging database as an interim processing step resolves this problem as described in that co-pending and related patent application. A staging database receives each partition serially from the agent, and the data in each partition is inserted into the staging database first, rather than the production database. When all the partitions associated with the very large dataset have been successfully inserted into the staging database, the production database synchronizes with the staging database. Thus, only the data from complete datasets are copied to the production database for display on the consoles or for access by other SAN management processes. Likewise, by first copying data to the staging database when it is received from agents, the production database can be maintained accessible in a read-only mode so that consoles, server processes and other SAN management processes can still, at least, view the production database, as opposed to having to take this database offline during transaction processing to avoid inconsistent view of data. It should be noted that the read-only mode only applies to the representative dataset.

Embodiments disclosed herein operate in conjunction with the staging system described in the above co-pending patent, and provide a system for runtime detection of synchronization and error conditions, and self-recovery of those conditions. Out of synchronization conditions can occur because of any errors, for example, during the copying of the data between the staging database/schema and the production schema. Typically, when an out of synchronization condition occurs, the system is brought offline, to prevent any additional data from being inserted into either database during the re-synchronizing of the staging database. Embodiments disclosed herein provide a system that detects and recovers from synchronization and error conditions without taking the system offline.

More specifically, embodiments described herein provide a system that includes a computer system executing a network management data recovering process. The network management data recovering process operates on a staging database or schema that is in communication with a production database or schema, and receives a dataset from an agent software process. The network management data recovering process detects when the staging database is not synchronized with the production database, due to an error. An error can occur during a routine process, such as copying data from the staging database to the production database, or can be detected during a scheduled process that periodically validates synchronization between the staging database and the production database. Upon detection of a data integrity error, the network management data recovering process changes the production tablespace to read only mode, and acquires an exclusively named lock. The network management data recovering process then aborts any partition transactions that are in process (i.e., any partitions that are being inserted into the staging database), and acquires exclusive locks on those tables associated with recording the changes resulting from the insertion (or the attempted insertion) of partitions into the staging database. The network management data recovering process calls a refresh process that performs a complete refresh of the staging database with data from the production database. The network management data recovering process then changes the production tablespace back to read write mode, and releases the exclusively named lock.

Embodiments disclosed include a computer system executing a network management data recovering process. The network management data recovering process detects an event suggesting a data discrepancy between a staging database and a production database that maintain network management data within a network management system. The staging database is logically separate from the production database. In one embodiment, the staging database is physically co-located with the production database, but logically separate. The network management data recovering process prevents modification to the production database, during a process of replacing data in the staging database with data from the production database. The network management data recovering process then allows modification to the production database.

During an example operation of one embodiment, suppose a system executing the network management data recovering process is in the process of performing a nightly job of comparing the data in the staging database with the data in the production database. The network management data recovering process detects a data mismatch between data in the staging database and data in the production database. The mismatch is detected via a Structured Query Language (SQL) query that is executed. The SQL query returns a non-zero value when the mismatch is detected. The network management data recovering process sets a status field in a staging status table to indicate a mismatch has been detected (if the status field isn't already set), and the label name of the database record (that has been identified as the mismatch) will be logged. The network management data recovering process changes the production table space to read only mode, and acquires an exclusively named lock "staging". The network management data recovering process then truncates the staging transaction and staging lockable and changeset table to abort any in progress partitioned transactions, and acquires exclusive locks on these tables including the staging status table. The network management data recovering process calls a refresh staging database procedure that overwrites the data in the staging database with the data in the production database. When this database procedure has completed, the status in the staging status table is updated, along with a timestamp associated with the completion of the refresh staging database procedure. The network management data recovering process changes the production database table space back to read-write mode and releases the exclusively named lock.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 2 shows a high-level block diagram of a Staging Lockable table and a Staging Status table according to one embodiment disclosed herein.

FIG. 4 illustrates a flowchart of a procedure performed by the system of FIG. 1 when the network management data recovering process detects an event suggesting a data discrepancy between a staging database and a production database that maintain network management data within a network, according to one embodiment disclosed herein.

FIG. 5 illustrates a flowchart of a procedure performed by the system of FIG. 1 when the network management data recovering process detects a failure during comparison between data in the staging database and data in the production database, according to one embodiment disclosed herein.

FIG. 6 illustrates a flowchart of a procedure performed by the system of FIG. 1 when the network management data recovering process records that a data discrepancy between the staging database and the production database has occurred, according to one embodiment disclosed herein.

FIG. 8 illustrates a flowchart of a procedure performed by the system of FIG. 1 when the network management data recovering process replaces data in the staging database with data from the production database, according to one embodiment disclosed herein.

DETAILED DESCRIPTION

Embodiments disclosed herein include methods and a computer system that perform a network management data recovering process. The network management data recovering process operates in a store process that accesses a staging database that is in communication with the production database and that receives a dataset from an agent software process. The network management data recovering process detects when the staging database is not synchronized with the production database, due to an error. An error can occur during a routine process, such as copying data from the staging database to the production database, or can occur during a scheduled process that periodically validates synchronization between the staging database and the production database. Upon detection of a data integrity error, the network management data recovering process changes the production table space to read only mode, and acquires an exclusively named lock. The network management data recovering process then aborts any partition transactions that are in process (i.e., any partitions that are being inserted into the staging database), and acquires exclusive locks on those tables associated with recording the changes resulting from the insertion (or the attempted insertion) of partitions into the staging database. The network management data recovering process calls a refresh process that performs a complete refresh of the staging database with data from the production database. The network management data recovering process then changes the production table space back to read write mode, and releases the exclusively named lock.

Embodiments disclosed include a computer system executing a network management data recovering process. The network management data recovering process detects an event suggesting a data discrepancy between a staging database and a production database that maintain network management data within a network management system. The staging database is logically separate from the production database. In one embodiment, the staging database is physically co-located with the production database, but logically separate. The network management data recovering process prevents modification to the production database, during a process of replacing data in the staging database with data from the production database. The network management data recovering process then allows modification to the production database.

Figure 1:
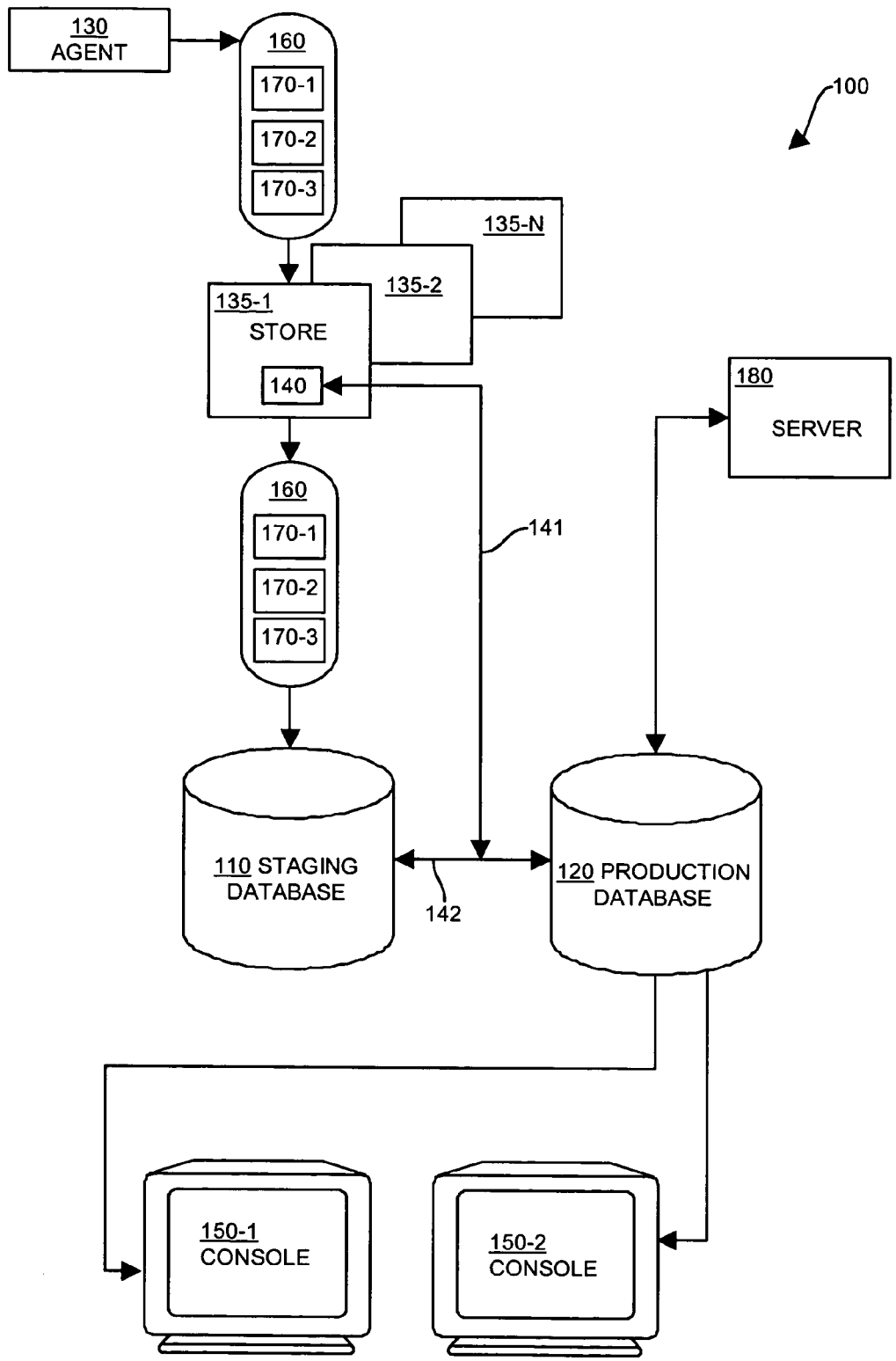
FIG. 1 shows a high-level block diagram of a computer system according to one embodiment disclosed herein.

FIG. 1 is a block diagram illustrating example architecture of a computer-networking environment 100 that includes an agent 130, a plurality of store systems 135-N, a computer system including a staging database 110, and a computer system that includes a production database 120. The staging database 110 is in communication with the production database 120 and synchronization between then can be engaged or disengaged as described herein. The production database 120 is in communication with at least one server 160 and at least one console 150-1. The store processes or systems 135 receive extra large datasets 160 of managed object data from the agent 130 as a series of partitions 170. In turn, the store process 135 transfers the data for the extra large dataset 160 from each of the plurality of partitions 170-N into the staging database 110. The staging database 110 receives the data from the plurality of partitions 170-N. The network management data recovering process 140, operating either in the store processes 135, or on the computer system on which the staging database 110 resides, stores the data (contained in the plurality of partitions 170-N) into the staging database 110. The network management data recovering process 140 then synchronizes the data (contained within the staging database 110) with the production database 120 for display on the consoles 150-N (or for access by other processes within the network management application).

The network management data recovering process 140 may be embodied as software code such as data and/or logic instructions (e.g., code stored in the memory or on another computer readable medium such as a removable disk) that supports processing functionality according to different embodiments described herein.

It is noted that example configurations disclosed herein include the network management data recovering process 140 itself (i.e., in the form of un-executed or non-performing logic instructions and/or data). The network management data recovering process 140 may be stored as an application on a computer readable medium (such as a floppy disk), hard disk, electronic, magnetic, optical, or other computer readable medium. The network management data recovering process 140 may also be stored in a memory system such as in firmware, read only memory (ROM), or, as in this example, as executable code in, for example, Random Access Memory (RAM). Those skilled in the art will understand that the agent 130, stores 135-N, server 180, production database 120, staging database 110, and consoles 150-N may include other processes and/or software and hardware components, such as an operating system not shown in this example.

FIG. 2 is a block diagram illustrating example architecture of a Staging Lockable table 142 and Staging Status table 146. The Staging Lockable table 142 includes a plurality of Staging Lockable records 144-N, and the Staging Status table 146 includes a plurality of Staging Status records 148-N. Each Staging Status record 148-1 contains a synchronization timestamp 152-1 and a synchronization status 154-1.

Further details of configurations explained herein will now be provided with respect to a flow chart of processing steps that show the high level operations disclosed herein to perform the network management data recovering process 140.

Figure 3:
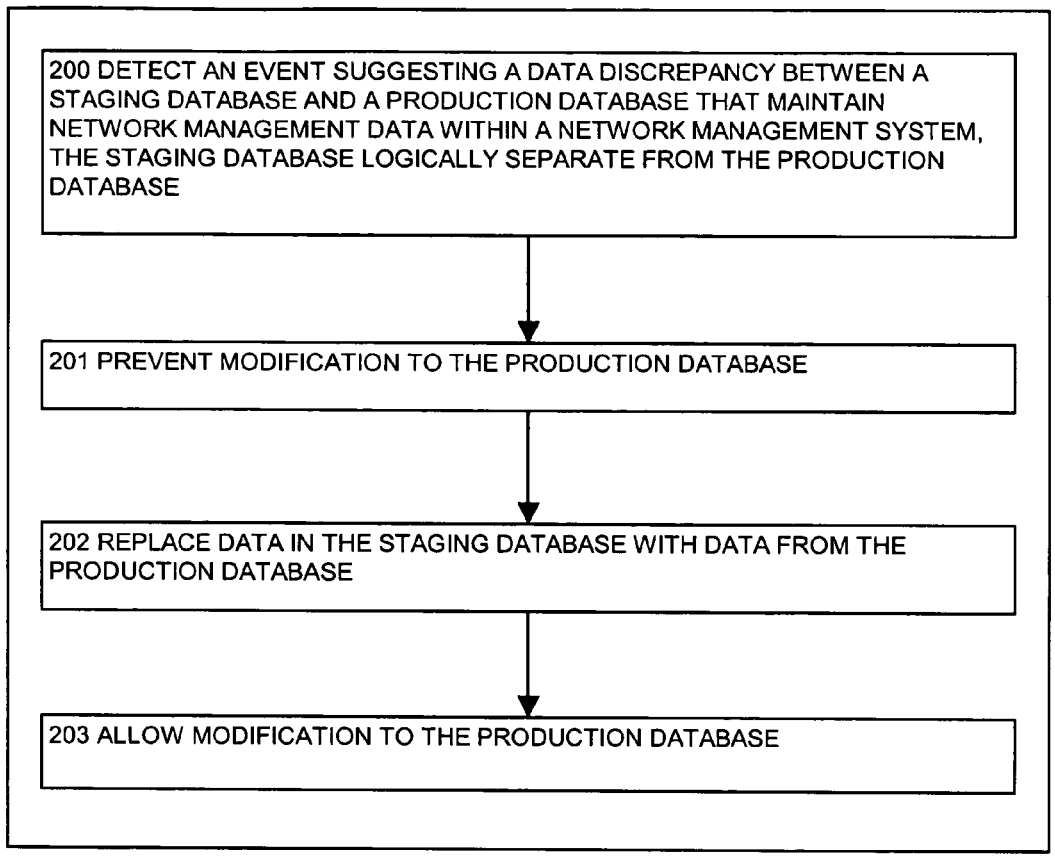
FIG. 3 illustrates a flowchart of a procedure performed by the system of FIG. 1 when the network management data recovering process detects an event suggesting a data discrepancy between a staging database and a production database, and replaces data in the staging database with data from the production database, according to one embodiment disclosed herein.

FIG. 3 is a flowchart of the steps performed by the network management data recovering process 140 when it detects an event suggesting a data discrepancy between a staging database 110 and a production database 120 that maintain network management data within a network management system.

In step 200, the network management data recovering process 140 detects an event suggesting a data discrepancy between a staging database 110 and a production database 120 that maintain network management data within a network management system. The staging database 110 is logically separate from the production database 120. In one embodiment, the staging database 110 and the production database 120 are physically co-located while being logically separated databases. The event detected could be, for example, a rogue thread competing with a 'good' thread.

In step 201, the network management data recovering process 140 prevents modification to the production database 120. The network management data recovering process 140 prevents modification to the production database 120 until after the data in the staging database 110 has been overwritten by the data in the production database 120. In one embodiment, the network management data recovering process 140 changes the production table space to read only mode, and acquires an exclusively named lock, for example "staging".

In step 202, the network management data recovering process 140 replaces data in the staging database 110 with data from the production database 120. The production database 120 is considered to be the 'master database'. Any data discrepancies between the staging database 110 and the production database 120 results in the network management data recovering process 140 replacing data in the staging database 110 with data from the production database 120.

In step 203, the network management data recovering process 140 allows modification to the production database 120. Following the step of replacing data in the staging database 110 with data from the production database 120, the network management data recovering process 140 changes the production table space to read write mode, allowing modification to the production database 120. Thus, the production database 120 can continue to receive data from the server 180, as well as receive data from the staging database 110.

FIG. 4 is a flowchart of the steps performed by the network management data recovering process 140 when it detects an event suggesting a data discrepancy between a staging database 110 and a production database 120 that maintain network management data within a network management system.

In step 204, the network management data recovering process 140 detects an event suggesting a data discrepancy between a staging database 110 and a production database 120 that maintain network management data within a network management system. The staging database 110 is logically separate from the production database 120. In one embodiment, the staging database 110 and the production database 120 are physically co-located while being logically separated databases.

In step 205, the network management data recovering process 140 detects a failure during a copy process that copies data from the staging database 110 to the production database 120. The staging database 110 receives datasets 160 from the agent 130 via the store system 135-1. Extra large datasets 160 are divided into partitions 170-N. These partitions 170-N are stored into the staging database 110, and once all the partitions that comprise the dataset 160 are successfully stored in the staging database 110, the dataset 160 is copied from the staging database 110 to the production database 120. Transmission errors can occur during this step of copying the dataset 160. The network management data recovering process 140 detects when such a failure occurs.

In step 206, the network management data recovering process 140 detects a failure during a retry process that retries a failed transaction process that accesses the staging database 110. The staging database 110 receives datasets 160 from the agent 130 via the store system 135-1. If an error occurs during this transaction, a retry message is sent out to the agent 130 to re-send the dataset 160 to the staging database 110. If an error occurs during the retry step, the network management data recovering process 140 detects this failure.

In step 207, the network management data recovering process 140 detects a failure of a store process that stores data associated with a non-partitioned transaction to the production database 120. The data associated with a non-partitioned transaction is received by the store process from an agent 130. The agent 130 collects data from managed objects within the network management system. Extra large datasets 160 are divided into partitions 170-N by the agent 130, for storing in the staging database 110 prior to being copied to the production database 120. In one embodiment, those datasets 160 that are not large enough to require partitioning are not stored in the staging database 110, but rather, pass through the staging database 110 to be stored into the production database 120. Errors can occur during the step of storing a dataset 160, received from the agent 130, into the production database

120. The network management data recovering process 140 detects when such a failure occurs.

In step 208, the network management data recovering process 140 detects a failure of a store process that stores data in the staging database 110, data that is received from the production database 120. In one embodiment, data is inserted into the production database 120 from the server 180. During a synchronization process that synchronizes the staging database 110 with the production database 120, the data, received from the server 180 and inserted into the production database 120, is copied into the staging database 110. Errors can occur during the step of copying the data from the production database 120 to the staging database 110 and the network management data recovering process 140 detects a when such a failure occurs.

FIG. 5 is a flowchart of the steps performed by the network management data recovering process 140 when it detects an event suggesting a data discrepancy between a staging database 110 and a production database 120 that maintain network management data within a network management system.

In step 209, the network management data recovering process 140 detects an event suggesting a data discrepancy between a staging database 110 and a production database 120 that maintain network management data within a network management system. The staging database 110 is logically separate from the production database 120.

In step 210, the network management data recovering process 140 detects a failure during comparison between data in the staging database 110 and data in the production database 120. In one embodiment, a process is executed periodically that performs a comparison between data in the staging database 110 and data in the production database 120. Detection of a data mismatch between the staging database 110 and the production database 120 will invoke a full refresh of the staging database 110.

In step 211, the network management data recovering process 140 executes a database query that performs a comparison between data in the staging database 110 and data in the production database 120. The database query returns a result indicating the comparison between data in the staging database 110, and data in the production database 120 failed. In an example embodiment, the mismatch is detected via Structured Query Language (SQL) query that is executed. The SQL query is structured to return the number of data mismatches between the staging database 110 and the production database 120. Ideally, the result of the SQL query should be zero. The SQL query returns a non-zero value when the mismatch is detected.

FIG. 6 is a flowchart of the steps performed by the network management data recovering process 140 when it detects an event suggesting a data discrepancy between a staging database 110 and a production database 120 that maintain network management data within a network management system.

In step 212, the network management data recovering process 140 detects an event suggesting a data discrepancy between a staging database 110 and a production database 120 that maintain network management data within a network management system. The event detected could be, for example, a failure of a copy process, copying data from the staging database 110 to the production database 120.

In step 213, the network management data recovering process 140 records that a data discrepancy between the staging database 110 and the production database 120 has occurred. The data recorded is used, for example, for debugging purposes.

In step 214, the network management data recovering process 140 raises an exception associated with the data discrepancy between the staging database 110 and the production database 120. In an example embodiment, the exception is a user defined exception.

In step 215, the network management data recovering process 140 logs an error associated with the data discrepancy, for example, a log error in a log table including the table name (i.e., associated with the error logged), and if possible, a persistent identifier and a transaction identifier.

Alternatively, in step 216, the network management data recovering process 140 records a staging table name indicating a staging table in the staging database 110 that is not synchronized with a corresponding production table in the production database 120. Within the staging database 110, tables are created that correspond to tables in the production database 120 that are affected by extra large datasets 160 received from the agent 130.

Alternatively, in step 217, the network management data recovering process 140 sets a synchronization status 154-1 in a Staging Status table 146. The synchronization status 154-1 indicates a data discrepancy has occurred in the staging database 110. For example, the synchronization status 154-1 is a one character field in the Staging Status table 146 that, when set, indicates a data discrepancy error has occurred.

In step 218, the network management data recovering process 140 records a synchronization timestamp 152-1 in the staging status table 146. The synchronization timestamp 152-1 indicates a date on which the data discrepancy between the staging database 110 and the production database 120 occurred.

Figure 7:
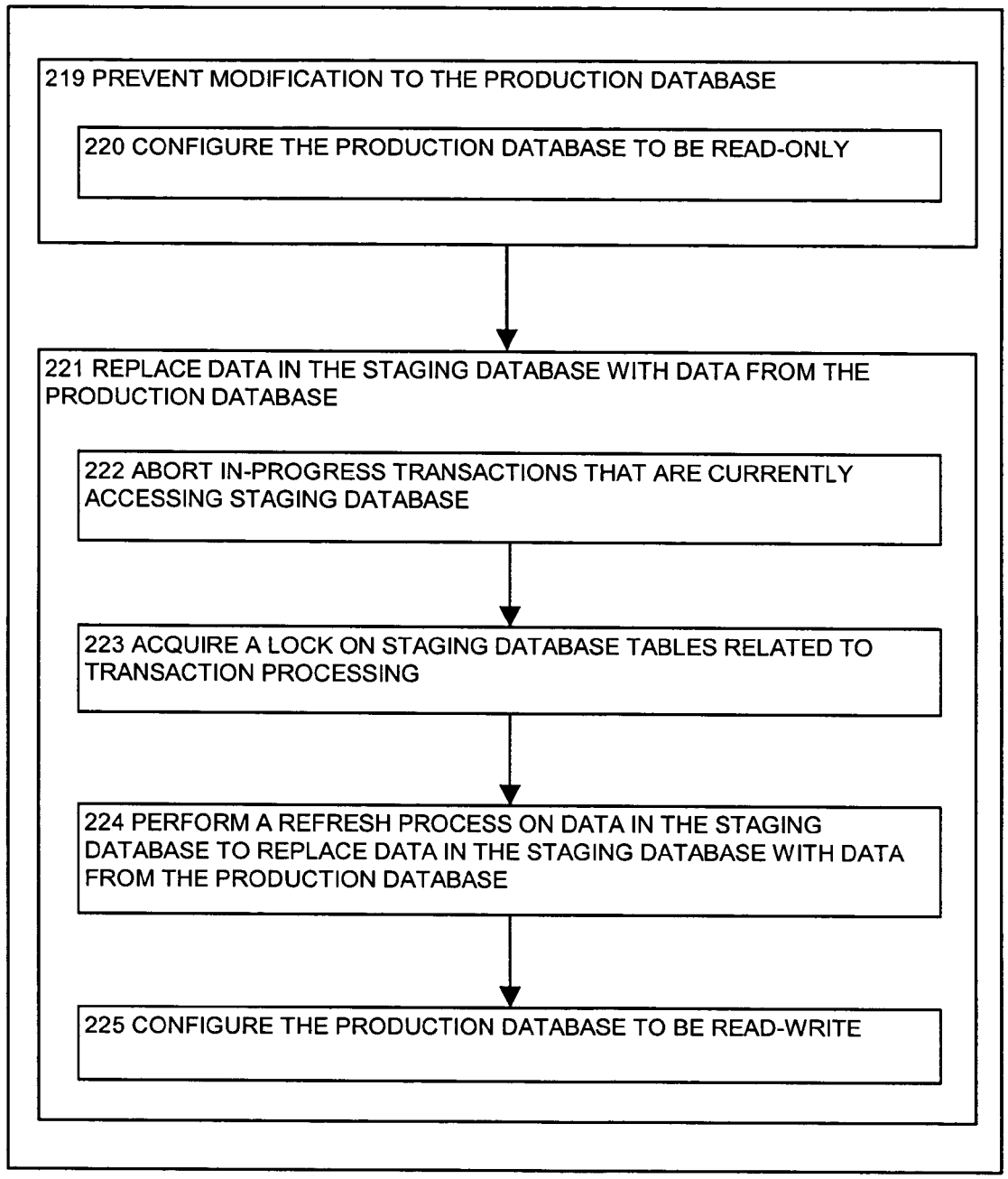
FIG. 7 illustrates a flowchart of a procedure performed by the system of FIG. 1 when the network management data recovering process prevents modification to the production database, according to one embodiment disclosed herein.

FIG. 7 is a flowchart of the steps performed by the network management data recovering process 140 when it prevents modification to the production database 120.

In step 219, the network management data recovering process 140 prevents modification to the production database 120. The network management data recovering process 140 prevents modification to the production database 120 until after the data in the staging database 110 has been overwritten by the data in the production database 120. In one embodiment, the network management data recovering process 140 changes the production table space to read only mode, and acquires an exclusively named lock, for example, "staging".

In step 220, the network management data recovering process 140 configures the production database 120 to be read-only such that no data is written to the production database 120 during the time data in the staging database 110 is being overwritten by the data in the production database 120. Data can continue to be read from the production database 120, for example, by a console 150-1 that displays data from the production database 120. However, a network manager would not be able to perform an action on an object on the console that triggers a data change to data in the production database 120.

In step 221, the network management data recovering process 140 replaces data in the staging database 110 with data from the production database 120. The production database 120 is considered to be the 'master database'. Any data discrepancies between the staging database 110 and the production database 120 result in the data in the staging database 110 being replaced with the data from the production database 120.

In step 222, the network management data recovering process 140 aborts in-progress transactions that are currently accessing staging database In step 223, the network management data recovering process 140 acquires a lock on staging database tables related to transaction processing. The staging database 110 receives datasets 160 from the agent 130. Extra large datasets 160 are divided into partitions 170-N, and those partitions 170-N are inserted into the staging database 110. As each data record from the dataset 160 is inserted into/deleted from/updated in the staging database 110, a changeset record is inserted into a changeset table. A transaction table maintains a status of changeset records in the changeset table. During the process of replacing data in the staging database 110 with data from the production database 120, network management data recovering process 140 acquires a lock on staging database tables related to transaction processing, for example, the changeset table and transaction table.

In step 224, the network management data recovering process 140 performs a refresh process on data in the staging database 110 to replace data in the staging database 110 with data from the production database 120. The refresh process overwrites the data in the staging database 110 with data in the production database 120 resulting in synchronization of the staging database 110 and the production database 120. During the refresh process, all read queries are permitted and all transactions that do not update tables belonging to the read only table space are permitted. During the refresh process, some processes, such as a refresh staging database process attempt to acquire a share lock in wait mode. If the share lock is granted, the lock will be released and the refresh staging database process will proceed. Otherwise, the refresh staging database process will wait for the share lock until the refresh process is completed. Some procedures, such as clean up processes and copy processes, try to acquire a share lock in no wait mode. In this scenario, if the share lock is granted, the lock is released upon completion of the transaction. If the procedures were not able to acquire the share lock, then a database exception will be raised and the processes will be aborted.

In step 225, the network management data recovering process 140 configures the production database 120 to be read-write. Upon completion of the refresh process, the network management data recovering process 140 configures the production database 120 to allow both reading from and writing to the production database 120.

FIG. 8 is a flowchart of the steps performed by the network management data recovering process 140 when it replaces data in the staging database 110 with data from the production database 120.

In step 226, the network management data recovering process 140 replaces data in the staging database 110 with data from the production database 120. The production database 120 is considered to be the 'master database'. Any data discrepancies between the staging database 110 and the production database 120 results in the network management data recovering process 140 replacing data in the staging database 110 with data from the production database 120.

In step 227, the network management data recovering process 140 detects that a database process is attempting to write data to the staging database 110 during the step of replacing data in the staging database 110 with data from the production database 120. For example, the agent 130 attempts to transmit a dataset 160 to the staging database 110 via the store system 135-1.

In step 228, the network management data recovering process 140 determines that the database process has attempted to acquire a lock on a staging table 110 associated with the data that the database process is attempting to write to the staging database 110. In an example embodiment, as each transaction attempts to write to the staging database 110, a process attempts to acquire a lock on each table (within the staging database 110) to which data will be written. The network management data recovering process 140 determines that a process has attempted to acquire locks on tables within the staging database 110 during the refresh process of copying data from the production database 120 to the staging database 110.

In step 229, the network management data recovering process 140 allows the database process to wait to acquire the lock on the staging table in the staging database 110. In response to the network management data recovering process 140 determining that a process has attempted to acquire locks on tables within the staging database 110, the network management data recovering process 140 allows those database processes to wait to acquire the requested locks on the staging tables within the staging database 110.

Alternatively, in step 230, the network management data recovering process 140 determine that the database process has not attempted to acquire a lock on a staging table associated with the data that the database process is attempting to write data to the staging database 110.

In step 231, the network management data recovering process 140 aborts the database process attempting to write data to the staging database 110. In response to discovering a database process (attempting to write data to staging tables within the staging database 110) has not attempted to acquire locks on those staging tables, the network management data recovering process 140 aborts that database process. All in progress partitioned transactions are aborted by the refresh process since this would remove transaction entries from a staging transaction table. All in progress server and non-partitioned store transactions are aborted with database errors when those transactions attempt to update production tables in the production database 120 belonging to read only table space.

In step 232, the network management data recovering process 140 invokes a database error during the attempt to write data to the staging database 110. After aborting the database process that is attempting to write data to the staging database 110 during the refresh process on the staging database 110, the network management data recovering process 140 invokes a database error.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computerized device comprising:
   a memory;
   a processor;
   a communications interface;
   an interconnection mechanism coupling the memory, the processor and the communications interface;
   wherein the memory is encoded with a network management data recovering application that when executed on the processor is capable of recovering network management data on the computerized device by performing the operations of:
     detecting an event suggesting a data discrepancy between a staging database and a production database that maintain network management data within a network management system, the staging database logically separate from the production database;
     preventing modification to the production database;

replacing data in the staging database with data from the production database; and allowing modification to the production database.

2. The computerized device of claim 1 wherein when the computerized device performs the operation of replacing data in the staging database with data from the production database, the computerized device is capable of performing the operation of:

aborting in-progress transactions that are currently accessing staging database;

acquiring a lock on staging database tables related to transaction processing;

performing a refresh process on data in the staging database to replace data in the staging database with data from the production database; and configuring the production database to be read-write.

3. A computer readable medium encoded with computer programming logic that when executed on a process in a computerized device provides network management data recovery, the medium comprising:

means for detecting an event suggesting a data discrepancy between a staging database and a production database that maintain network management data within a network management system, the staging database logically separate from the production database;

means for preventing modification to the production database;

means for replacing data in the staging database with data from the production database; and means for allowing modification to the production database.

4. The computer readable medium of claim 3 wherein said means for replacing data in the staging database with data from the production database further comprises:

means for aborting in-progress transactions that are currently accessing staging database;

means for acquiring a lock on staging database tables related to transaction processing;

means for performing a refresh process on data in the staging database to replace data in the staging database with data from the production database; and means for configuring the production database to be read-write.

5. A method for processing network management data, the method comprising:

detecting an event suggesting a data discrepancy between a staging database and a production database that maintain network management data within a network management system, the staging database logically separate from the production database;

preventing modification to the production database;

replacing data in the staging database with data from the production database; and allowing modification to the production database.

6. The method of claim 5 wherein detecting an event suggesting a data discrepancy between a staging database and a production database that maintain network management data within a network management system comprises:

detecting a failure during a copy process that copies data from the staging database to the production database.

7. The method of claim 5 wherein detecting an event suggesting a data discrepancy between a staging database and a production database that maintain network management data within a network management system comprises:

detecting a failure during a retry process that retries a failed transaction process that accesses the staging database.

8. The method of claim 5 wherein detecting an event suggesting a data discrepancy between a staging database and a production database that maintain network management data within a network management system comprises:

detecting a failure of a store process that stores data associated with a non-partitioned transaction to the production database, the data associated with a non-partitioned transaction received by the store process from an agent.

9. The method of claim 5 wherein detecting an event suggesting a data discrepancy between a staging database and a production database that maintain network management data within a network management system comprises:

detecting a failure of a store process that stores data in the staging database, the data received from the production database.

10. The method of claim 5 wherein detecting an event suggesting a data discrepancy between a staging database and a production database that maintain network management data within a network management system comprises:

detecting a failure during comparison between data in the staging database and data in the production database.

11. The method of claim 10 wherein detecting a failure during a comparison between data in the staging database and data in the production database comprises:

executing a database query that performs a comparison between data in the staging database and data in the production database, the database query returning a result indicating the comparison between data in the staging database and data in the production database failed.

12. The method of claim 5 wherein detecting an event suggesting a data discrepancy between a staging database and a production database that maintain network management data within a network management system comprises:

recording that a data discrepancy between the staging database and the production database has occurred.

13. The method of claim 12 wherein recording that a data discrepancy between the staging database and the production database has occurred comprises:

raising an exception associated with the data discrepancy between the staging database and the production database; and logging an error associated with the data discrepancy.

14. The method of claim 12 wherein recording that a data discrepancy between the staging database and the production database has occurred comprises:

recording a staging table name indicating a staging table in the staging database that is not synchronized with a corresponding production table in the production database.

15. The method of claim 12 wherein recording that a data discrepancy between the staging database and the production database has occurred comprises:

setting a status in a staging status table, the status indicating a data discrepancy has occurred; and recording a timestamp in the staging status table, the timestamp indicating a date on which the data discrepancy occurred.

16. The method of claim 5 wherein preventing modification to the production database comprises:

configuring the production database to be read-only.

17. The method of claim 16 wherein replacing data in the staging database with data from the production database comprises:

aborting in-progress transactions that are currently accessing staging database;

acquiring a lock on staging database tables related to transaction processing;

performing a refresh process on data in the staging database to replace data in the staging database with data from the production database; and configuring the production database to be read-write.

18. The method of claim 5 wherein replacing data in the staging database with data from the production database comprises:

detecting that a database process is attempting to write data to the staging database during the step of replacing data in the staging database with data from the production database.

19. The method of 18 wherein detecting that a database process is attempting to write data to the staging database during the step of replacing data in the staging database with data from the production database comprises:

determining that the database process has attempted to acquire a lock on a staging table associated with the data that the database process is attempting to write to the staging database; and allowing the database process to wait to acquire the lock on the staging table.

20. The method of 18 wherein detecting that a database process is attempting to write data to the staging database during the step of replacing data in the staging database with data from the production database comprises:

determining that the database process has not attempted to acquire a lock on a staging table associated with the data that the database process is attempting to write data to the staging database; and aborting the database process attempting to write data to the staging database; and invoking a database error during the attempt to write data to the staging database.

* * * * *